United States Patent
Eoff et al.

(10) Patent No.: US 11,248,167 B2
(45) Date of Patent: Feb. 15, 2022

(54) ACID DIVERSION IN NATURALLY FRACTURED FORMATIONS

(71) Applicant: Halliburton Energy Services, Inc., Houston, TX (US)

(72) Inventors: Larry Steven Eoff, Porter, TX (US); Tiffany Anne Pinder, Houston, TX (US); Antonio Recio, III, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 305 days.

(21) Appl. No.: 16/090,796

(22) PCT Filed: Jun. 30, 2016

(86) PCT No.: PCT/US2016/040539
§ 371 (c)(1),
(2) Date: Oct. 2, 2018

(87) PCT Pub. No.: WO2018/004624
PCT Pub. Date: Jan. 4, 2018

(65) Prior Publication Data
US 2020/0002603 A1 Jan. 2, 2020

(51) Int. Cl.
*E21B 43/26* (2006.01)
*C09K 8/76* (2006.01)
*C09K 8/68* (2006.01)
*C09K 8/80* (2006.01)
*E21B 43/267* (2006.01)

(52) U.S. Cl.
CPC ............ *C09K 8/76* (2013.01); *C09K 8/68* (2013.01); *C09K 8/80* (2013.01); *E21B 43/26* (2013.01); *E21B 43/267* (2013.01)

(58) Field of Classification Search
CPC .. C09K 8/76; C09K 8/80; E21B 43/26; E21B 43/267
See application file for complete search history.

(56) References Cited

U.S. PATENT DOCUMENTS

| | | | |
|---|---|---|---|
| 6,476,169 B1 * | 11/2002 | Eoff | C09K 8/12 526/259 |
| 7,182,136 B2 | 2/2007 | Dalrymple et al. | |
| 7,775,278 B2 | 8/2010 | Willberg et al. | |
| 8,714,249 B1 * | 5/2014 | Tang | C09K 8/703 166/281 |
| 9,759,052 B2 * | 9/2017 | Hutchins | E21B 43/162 |
| 2005/0000694 A1 * | 1/2005 | Dalrymple | C09K 8/68 166/307 |

(Continued)

OTHER PUBLICATIONS

International Search Report and Written Opinion for PCT/US2016/040539 dated Mar. 31, 2017.

(Continued)

*Primary Examiner* — Silvana C Runyan
(74) *Attorney, Agent, or Firm* — Thomas Rooney; C. Tumey Law Group PLLC

(57) ABSTRACT

A method for treating a subterranean formation that includes preparing a treatment fluid comprising a base fluid, a relative permeability modifier (RPM) and a particulate and performing a treatment operation by injecting the treatment fluid into a portion of the subterranean formation.

24 Claims, 2 Drawing Sheets

(56) References Cited

U.S. PATENT DOCUMENTS

| | | | |
|---|---|---|---|
| 2006/0124309 A1* | 6/2006 | Nguyen | C09K 8/5751 |
| | | | 166/308.2 |
| 2006/0185848 A1* | 8/2006 | Surjaatmadja | C09K 8/80 |
| | | | 166/280.2 |
| 2006/0240994 A1 | 10/2006 | Eoff et al. | |
| 2006/0266522 A1 | 11/2006 | Eoff et al. | |
| 2010/0216672 A1* | 8/2010 | Todd | C09K 8/516 |
| | | | 507/201 |
| 2011/0098377 A1 | 4/2011 | Huang et al. | |
| 2012/0135895 A1* | 5/2012 | Eoff | C09K 8/508 |
| | | | 507/222 |
| 2012/0279704 A1* | 11/2012 | Eoff | C09K 8/5751 |
| | | | 166/280.2 |
| 2014/0338907 A1 | 11/2014 | Reddy et al. | |
| 2017/0002262 A1* | 1/2017 | Recio, III | C09K 8/885 |
| 2018/0149008 A1* | 5/2018 | Nguyen | C09K 8/66 |

OTHER PUBLICATIONS

"Understanding Diversion with a Novel Fiber-Laden Acid System for Matrix Acidizing of Carbonate Formations" Cohen et al. SPE 134495 dated 2010.

\* cited by examiner

ACID DIVERSION IN NATURALLY FRACTURED FORMATIONS

FIELD

The present invention relates to improvements in the stimulation of hydrocarbon production from subterranean formations. More particularly, the present invention relates to methods of acidizing and/or fracturing subterranean formations to stimulate or increase hydrocarbon production.

BACKGROUND

Generally, well treatments of an oil or gas well involve the injection of a fluid into the formation to stimulate production from the well by increasing the permeability of the oil or gas through the formation.

A widely used stimulation technique is hydraulic fracturing, in which a fracturing fluid is injected through a well into the surrounding formation at a sufficient pressure to fracture the formation adjacent to the well. These induced fractures create a channel for fluid flow through the formation back to the well. Usually a particulate material, referred to as a "proppant," is deposited into the fracture to help prop the fracture open for fluid flow back after the hydraulic pressure is released.

Another common stimulation technique is acidizing, in which an aqueous acid treatment is introduced into the formation to dissolve acid-soluble materials and open or create formation channels. In this way, hydrocarbon fluids can more easily flow through the formation into the well. Acidizing techniques can be carried out as "matrix acidizing" procedures or as "acid fracturing" procedures.

In matrix acidizing, the acidizing treatment fluid is injected into the formation at a rate and pressure below the pressure which is sufficient to create a fracture in the formation. The acid permeates into channels and dissolves materials that clog or constrict the channels, thereby increasing permeability of the formation. Thus, an increase in permeability is achieved primarily by the reaction of the acid within the formation, and little or no permeability increase is due to inducing fractures within the formation.

In acid fracturing an increase in permeability is achieved by inducing fractures in the formation, in addition to the acid etching within the formation. The acidizing treatment fluid is injected into the formation to be fractured at a rate and pressure above the pressure which is sufficient to create a fracture. Sufficient pressure is applied to form one or more fractures in the formation.

While hydrocarbon producing wells are usually completed in hydrocarbon-producing formations, the formations frequently contain layers of water-bearing sections or may be located adjacent to water-bearing sections. The high mobility of water often allows it to flow into the wellbore by way of natural fractures and/or high permeability streaks present in the formation.

Furthermore, when an acidizing treatment fluid is used to increase the productivity of a hydrocarbon-bearing interval, the aqueous fluid can tend to predominately enter a water-bearing section instead of a hydrocarbon-bearing section. This is because the water-bearing section is relatively more permeable to the aqueous fluid than the hydrocarbon-bearing section. Thus, acid stimulation often results in increasing the water cut because of the preferential stimulation of the water-bearing section.

The production of water with hydrocarbons, i.e., oil and/or gas, from wells constitutes a major problem and expense in the production of hydrocarbons from subterranean formations. The expense includes the energy in moving the water to the surface, separating the water from the produced hydrocarbon, and disposing of the waste water.

Controlling fluid placement is essential to the success of matrix stimulation treatments, especially in carbonate formations. A variety of techniques have been developed to improve acid placement; however, each has particular drawbacks. The use of mechanical isolation techniques such as bridge plugs and packers can be operationally complex, requiring multiple well interventions, and can present additional operational risks due to longer times and multiple mechanical tools that are employed.

Thus, there is a need for improved methods of treating subterranean formations to direct the acidizing and/or fracturing treatment fluid for optimal results.

BRIEF DESCRIPTION OF DRAWINGS

The accompanying views of the drawing are incorporated into and form a part of the specification to illustrate aspects and examples of the present invention. The figures are only for the purpose of illustrating examples of how the various aspects of the invention can be made and used and are not to be construed as limiting the invention to only the illustrated and described examples.

DETAILED DESCRIPTION

Figure 1:
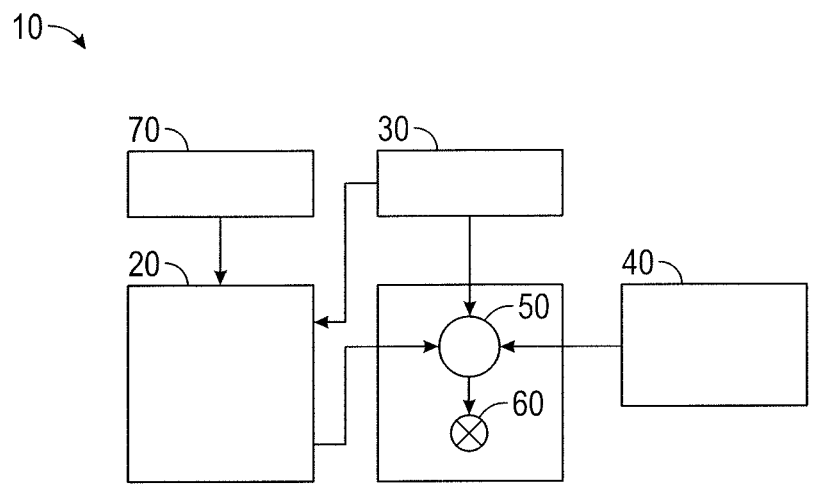
FIG. 1 is a diagram illustrating an example of a fracturing system that may be used in accordance with certain embodiments of the present disclosure.

The present invention provides a method of acidizing and/or fracturing a subterranean formation penetrated by a wellbore. The method includes introducing into the subterranean formation a combination of one or more relative permeability modifier(s) (RPM) and particulates. The method can be particularly effective in treating dual porosity formations such as naturally fractured and/or vugular carbonate, shale or sandstone reservoirs.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 2:
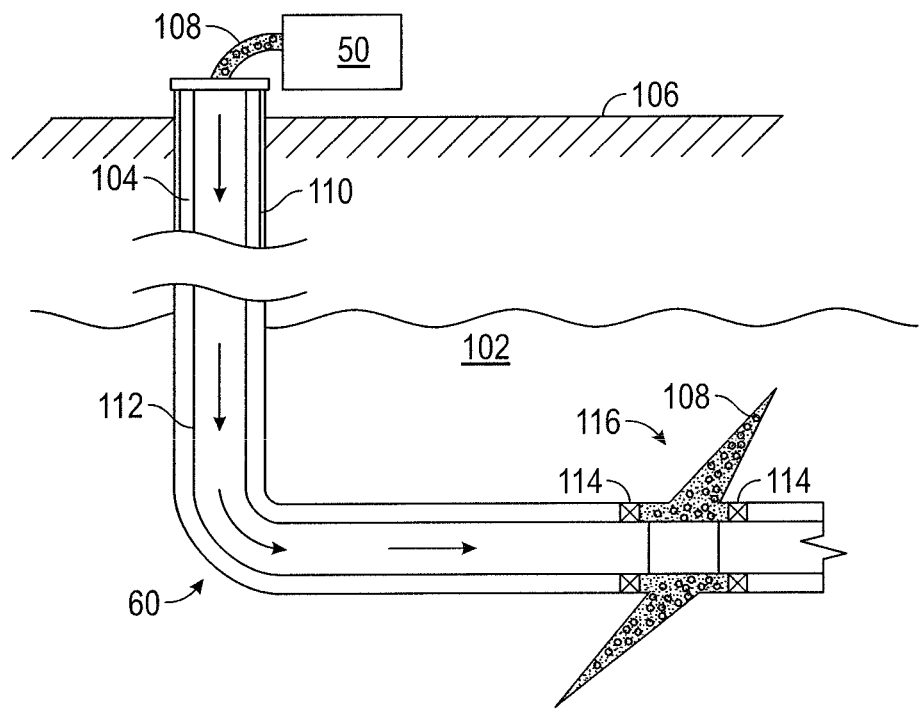
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Relative Permeability Modifiers

Various chemicals have been utilized in attempts to decrease the production of water with hydrocarbons. These chemicals can be referred to as relative permeability modifiers (RPM), and sometimes referred to as disproportionate permeability reducers or selective plugging systems. An RPM polymer, such as polyacrylamide, is dissolved in water and pumped into a subterranean formation that produces water and hydrocarbon, with the objective of reducing the permeability of water through the formation without substantially affecting the permeability of hydrocarbon. That is, water permeability modifying chemicals such as polyacrylamide have been introduced into hydrocarbon and water producing formations so that the chemicals attach to adsorption sites on surfaces within the porosity of the formation and reduce the permeability of water through the formation without substantially reducing the hydrocarbon permeability.

The presence of the RPM chemicals in the formation has the effect of reducing the flow of water through the formation. The use of RPM chemicals for permanent results has typically provided poor performance due to inadequate retention within the formation. Many of these conventional RPM water-control compounds degrade with increased temperature, rendering them useless in many long term downhole applications.

In the present invention RPM chemicals are used for reducing matrix permeability during a relatively short term fracturing or acidizing operation. The ability of the RPM water-control compounds to degrade with increased temperature, is a benefit. This property can enable the temporary reduction in the matrix permeability and permeability of micro-fractures when desired, while not causing an undesirable long term permeability reduction.

Suitable RPMs have estimated molecular weights in the range of from about 200,000 to about 3,000,000. Particularly suitable polymers having molecular weights in the ranges set forth above include, but are not limited to, an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer.

According to a further aspect of the invention, the RPM can be a hydrophobically-modified polymer that is the reaction product of a hydrophilic polymer and a hydrophobic compound that are capable of reacting with each other. Hydrophilic polymers suitable for use in the aqueous solutions of the invention can be polymers containing reactive amino groups in the polymer backbone or as pendant groups, which are capable of reacting with hydrophobic alkyl halide compounds. Embodiments of the RPM can have mole ratios of the hydrophilic monomer(s) to the hydrophobically modified hydrophilic monomer(s) in the range of from about 99.98:0.02 to about 90:10.

The polymers useful in accordance with this invention can be prepared from a variety of hydrophilic monomers and hydrophobically modified hydrophilic monomers. Examples of particularly suitable hydrophilic monomers which can be utilized include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, trimethylammoniumethyl methacrylate chloride, methacrylamide and hydroxyethyl acrylate.

A variety of hydrophobically modified hydrophilic monomers can also be utilized to form the polymers useful in accordance with this invention. Particularly suitable hydrophobically modified hydrophilic monomers include, but are not limited to, alkyl acrylates, alkyl methacrylates, alkyl acrylamides and alkyl methacrylamides wherein the alkyl radicals have from about 2 to about 25 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 2 to about 25 carbon atoms and alkyl dimethylammonium-propylmethacrylamide bromide, alkyl dimethylammonium propylmethacrylamide chloride and alkyl dimethylammonium-propylmethacrylamide iodide wherein the alkyl groups have from about 2 to about 25 carbon atoms, octadecyldimethylammoniumethyl methacrylate bromide, hexadecyldimethyl-ammoniumethyl methacrylate bromide, hexadecyldimethylammoniumpropyl methacrylate bromide, 2-ethylhexyl methacrylate, hexadecyl methacrylate, and any combination thereof.

Polymers which are useful in accordance with the present invention can be prepared by polymerizing any one or more of the hydrophilic monomers with any one or more of the hydrophobically modified hydrophilic monomers. While the polymerization reaction can be performed in various ways, an example of a particularly suitable procedure for polymerizing water soluble monomers is as follows. Into a 250 mL 3 neck round bottom flask, charge the following: 47.7 g DI water, 1.1 g acrylamide and 0.38 g alkyl dimethylammoniumethyl methacrylate bromide. The solution formed is sparged with nitrogen for approximately 30 minutes, followed by the addition of 0.0127 g of 2,2'-azobis (2-amidinopropane) dihydrochloride. The resulting solution is then heated, with stirring, to 110° F. and held for 18 hours to produce a highly viscous polymer solution.

When the hydrophobically modified hydrophilic monomer is not water soluble, e.g., octadecylmethacrylate, the following procedure can be utilized. Into a 250 mL 3 neck round bottom flask, charge the following: 41.2 g DI water and 1.26 g acrylamide. The solution formed is sparged with nitrogen for approximately 30 minutes, followed by the addition of 0.06 g of octadecyl methacrylate and 0.45 g of a cocoamidopropyl betaine surfactant. The mixture is stirred until a homogeneous, clear solution is obtained followed by the addition of 0.0055 g of 2,2'-azobis (2-amidinopropane) dihydrochloride. The resulting solution is then heated, with stirring, to 110° F. and held for 18 hours to produce a highly viscous polymer solution.

In addition, the polymerization procedure may employ a hydrocarbon reaction medium instead of water. In this case, appropriate surfactants can be used to emulsify the hydrophilic/hydrophobic monomers, and the product is obtained as an oil external/water internal emulsion.

Suitable polymers prepared as described above have estimated molecular weights of from about 250,000 to about 3,000,000 kiloDaltons (kDa) and have mole ratios of the hydrophilic monomer(s) to the hydrophobically modified hydrophilic monomer(s) of from about 99.98:0.02 to about 90:10. Suitable polymers having molecular weights and mole ratios in the ranges set forth above include, but are not limited to, an acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer. In certain embodiments, an acrylamide/octadecyl dimethylammoniumethyl methacrylate bromide copolymer having a mole ratio of hydrophilic monomer to hydrophobically modified hydrophilic monomer of 96:4 may be used in accordance with the present disclosure. In certain embodiments, a dimethylaminoethyl methacrylate/hexadecyldimethylammoniumethyl methacrylate bromide copolymer may be used in accordance with the present disclosure.

RPMs can be homopolymers, copolymers or higher order polymer structures containing a monomer, such as a hydrophilic monomer. For example, in one embodiment, a RPM can contain a copolymer of dimethylaminoethyl methacrylate and cetyldimethylammoniumethyl methacrylate halide. This RPM is sold under the trade name "HPT-1" by Halliburton Energy Services of Houston, Tex.

In an embodiment the relative permeability modifiers in accordance with the present disclosure are generally hydrophobically-modified hydrophilic polymers that have been functionalized to include at least one sulfonate moiety. Without limiting the disclosure to any particular theory or mechanism, it is believed that in certain embodiments, the sulfonate moiety of the relative permeability modifiers serves as an anchoring group that may slow the rate of polymer desorption from carbonate rock surfaces. Moreover, without limiting the disclosure to any particular theory or mechanism, it is believed that in certain embodiments, the sulfonate moiety, due to its electrostatically repulsive nature, may elongate the polymer and allow for carboxylate groups that may be present on the polymer backbone of the relative permeability modifier to more favorably interact with carbonate rock surfaces. In addition, it is also believed that in certain embodiments, an otherwise cationic charge of a relative permeability modifier may be masked by the addition of an anionic sulfonate moiety, and thus, may allow the relative permeability modifier to perform better on carbonate rock surfaces, which are generally cationic.

In an embodiment the relative permeability modifiers of the present disclosure are also stable at temperatures of up to about 325° F. in some embodiments. Without wishing to be limited to any particular theory, it is believed that the presence of the sulfonate moiety enhances the stability of the relative permeability modifiers of the present disclosure such that they perform well when exposed to elevated temperatures, such as those encountered in a subterranean formation, over long periods of time.

To form the relative permeability modifiers of the present disclosure, an anionic sulfonate moiety may be added by a conjugate addition reaction to the polymers described above. In certain embodiments, when the polymer is a hydrophobically modified polyDimethylaminoethyl methacrylate, the relative permeability modifiers of the present disclosure may be formed by the following reaction:

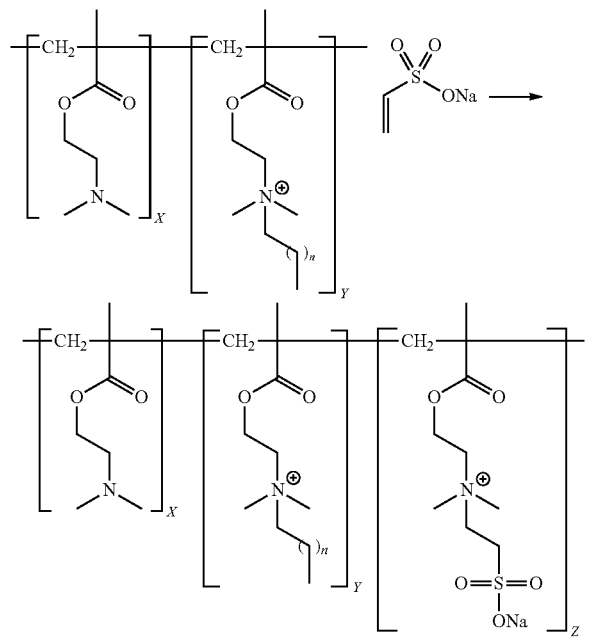

The reaction shown above yields one example of a relative permeability modifier of the present disclosure, wherein X is an integer from 1500 to 20,000, Y is an integer from 25 to 320, Z is an integer from 25 to 430, and n is an integer from 2 to 25. The ranges of X, Y, and Z are dependent upon the molecular weight of the hydrophobically-modified hydrophilic polymer. The hydrophobically-modified hydrophilic polymers that are useful in accordance with the present disclosure generally have a molecular weight from about 250,000 kDa to about 3,000,000 kDa. In certain embodiments, the portion of the relative permeability modifier reaction product indicated with subscript Y above (hydrophobically-modified polyDimethylaminoethyl methacrylate) should be present in the relative permeability modifier in an amount of from about 0.5 mol % to about 30 mol %. In certain embodiments, the portion of the relative permeability modifier reaction product shown with subscript Z above (polyDimethylaminoethyl methacrylate functionalized with sulfonate moiety) should be present in the relative permeability modifier in an amount of from about 0.5 mol % to about 30 mol %.

The sulfonate moiety may generally be present in the relative permeability modifiers of the present disclosure in an amount of from about 0.5 mol % to about 30 mol %. As indicated by the reaction above, the functionalization of the polymer with the sulfonate moiety quarternizes a nitrogen present on the polymer, thereby resulting in a charge on the nitrogen. The sulfonate moiety of the relative permeability modifiers of the present disclosure may be any salt or ester of a sulfonic acid. One example of a sulfonate that may be reacted with a hydrophobically-modified hydrophilic polymer to form the relative permeability modifiers of the present disclosure includes, but is not limited to, sodium vinyl sulfonate.

In certain embodiments, the relative permeability modifiers of the present disclosure may be introduced into a subterranean formation as part of a treatment fluid to treat a subterranean formation. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

The relative permeability modifiers of the present disclosure may be introduced into a subterranean formation to treat a water and hydrocarbon producing formation to reduce the water permeability of the formation without substantially reducing the hydrocarbon permeability of the formation. In certain embodiments, the treatment fluids comprising relative permeability modifiers may be introduced into a subterranean formation using one or more pumps. In certain embodiments, the subterranean formation may be a carbonate formation or reservoir that includes a carbonate rock surface. In certain embodiments, the relative permeability modifiers of the present disclosure may be introduced into a subterranean formation to be treated so that the relative permeability modifier attaches to adsorption sites on the surfaces within the porosity of the formation. In certain embodiments, the surfaces may be carbonate rock surfaces.

The treatment fluids used in the methods of the present disclosure may comprise any base fluid known in the art, including aqueous fluids, non-aqueous fluids, and any combinations thereof. Base fluids that may be useful in accordance with the present disclosure may be any suitable fluid that does not adversely affect the properties of the relative permeability modifiers and that may be used for introducing the relative permeability modifiers into a subterranean formation. Aqueous fluids that may be suitable for use in accordance with the present disclosure may comprise water from any source. Examples of suitable aqueous fluids include, but are not limited to, fresh water, deionized water, brine, seawater, aqueous salt solutions, and any combination thereof. In certain embodiments, the aqueous fluid may be an aqueous salt solution containing one or more salts in an amount of from about 2% to about 10% by weight of the solution. Examples of suitable salts that may be utilized in the aqueous salt solution include, but are not limited to, potassium chloride, sodium chloride, ammonium chloride, and calcium chloride. Examples of non-aqueous fluids that may be suitable for use in accordance with the present disclosure include, but are not limited to, oils, hydrocarbons, organic liquids, and the like.

In certain embodiments, the relative permeability modifiers of the present disclosure may be present in the treatment fluid in an amount of from about 100 parts per million (ppm) to about 15,000 ppm. In certain embodiments, the relative permeability modifiers of the present disclosure may be present in the treatment fluid in an amount of from about 1500 ppm to about 2000 ppm.

Particulates

Various particulates have been utilized in attempts to divert fluids during fracturing and acidizing operations, including the use of particulates for plugging fractures. The particulates are introduced into the wellbore fluid, such as completion fluids, acid or frac fluid. As the fluid within the wellbore is lost into the formation the particulates will be carried along with the fluid and enter the formation, such as through a fracture. As the particulates have a size and shape that tends to be larger than the pores of the formation matrix, they will congregate on the surface of the formation where the fluid is being lost. The build-up of the particulates will inhibit the fluid loss at the point of particulate build up and will act to divert the fluid flow elsewhere. An example is where particulates enter a fracture and build up within the fracture until the fracture is filled with the particulate matter to the point where it is not capable of receiving further significant fluid flow.

Various degradable materials can be used as particulates with embodiments of the invention. Such materials include inorganic fibers, for example of limestone or glass, but are more commonly polymers or co-polymers of esters, amides, or other similar materials. They may be partially hydrolyzed at non-backbone locations. Examples include polyhydroxyalkanoates, polyamides, polycaprolactones, polyhydroxybutyrates, polyethyleneterephthalates, hydrophobically-modified polyvinyl pyrrolidinones, polyvinyl pyrrolidinones; polyvinyl pyrrolidinone co-polymers, polyvinyl alcohols, polyvinyl acetate, partially hydrolyzed polyvinyl acetate, and copolymers of these materials. Polymers or co-polymers of esters, for example, include substituted and unsubstituted lactide, glycolide, polylactic acid, and polyglycolic acid. Polymers or co-polymers of amides, for example, may include polyacrylamides. Materials that dissolve at the appropriate time under the encountered conditions are also used, for example polyols containing three or more hydroxyl groups. Polyols useful in the present invention are polymeric polyols solubilized upon heating, desalination or a combination thereof, and consist essentially of hydroxyl-substituted carbon atoms in a polymer chain spaced from adjacent hydroxyl-substituted carbon atoms by at least one carbon atom in the polymer chain. In other words, the useful polyols can be essentially free of adjacent hydroxyl substituents. In one embodiment, the polyols have a weight average molecular weight greater than 5000 up to 500,000 or more, and from 10,000 to 200,000 in another embodiment. The polyols may if desired be hydrophobically modified to further inhibit or delay solubilization, e.g. by including hydrocarbyl substituents such as alkyl, aryl, alkaryl or aralkyl moieties and/or side chains having from 2 to 30 carbon atoms. The polyols may also be modified to include carboxylic acid, thiol, paraffin, silane, sulfuric acid, acetoacetylate, polyethylene oxide, quaternary amine, or cationic monomers. In one embodiment, the polyol is a substituted or unsubstituted polyvinyl alcohol that can be prepared by at least partial hydrolysis of a precursor polyvinyl material with ester substituents. Although it is normally not necessary, the degradation may be assisted or accelerated by a wash containing an appropriate dissolver or that changes the pH or salinity. The degradation may also be assisted by an increase in temperature, for example when the treatment is performed before steamflooding. As used herein when we use the term degradable, we include all of these suitably dissolvable materials.

These degradable or dissolvable materials may be in any shape: for example, powder, particulates, chips, fiber, bead, ribbon, platelet, film, rod, strip, spheroid, toroid, pellet, tablet, capsule, shaving, any round cross-sectional shape, any oval cross-sectional shape, trilobal shape, star shape, flat shape, angular shape, rectangular shape, cubic, bar shaped, flake, cylindrical shape, filament, thread, or mixtures thereof. The degradable or dissolvable materials are solid materials, either amorphous or/and crystalline in nature, and generally are not liquid materials. Material densities are typically not critical, and will usually range from below about 1 to about 4 $g/cm^3$ or more. The materials may be naturally occurring and synthetically prepared, or a mixture thereof. These degradable or dissolvable materials may even be biodegradable or composed of synthetic organic polymers or elastomers, as well as particular inorganic materials, or mixtures of such materials. The degradable or dissolvable materials are typically present in the treatment fluid as a finely dispersed material, while not used as a bulk phase or solid bulk form.

Some embodiments may use degradable or dissolvable materials in the form of fibers. As employed herein, the term "fibers" refers to bodies or masses, such as filaments, of natural or synthetic material(s) having one dimension longer than the other two, which are at least similar in size, and further includes mixtures of such materials having multiple sizes and types. The fibers may have a length of about 2 to about 25 mm, optionally about 3 to about 18 mm. Typically, the fibers have a denier of about 0.1 to about 20, optionally about 0.15 to about 6. The fibers desirably degrade under downhole conditions in a duration that is suitable for the selected operation. The fibers may have a variety of shapes ranging from simple round or oval cross-sectional areas to more complex shapes such as trilobe, figure eight, star-shape, rectangular cross-sectional, or the like. When fibers are used, generally straight fibers with round or oval cross sections will be used. Curved, crimped, branched, spiral-shaped, hollow, fibrillated, and other three dimensional fiber geometries may be used. Again, the fibers may be hooked on one or both ends.

Degradable materials will dissolve with time and unplug the fracture. The degradable materials may be of a variety of properties, shapes and compositions. The material decay or disintegration may be chemically, temperature or mechanically driven. Methods of the invention may be performed with any suitable equipment used in the industry.

Combinations of RPM and Particulates

This disclosure is in regard to a combination of RPM's and particulates for the treatment of formations, such as dual porosity formations, whereby the particulates would plug/seal fractures and the RPM would reduce matrix permeability and/or would reduce the permeability of microfractures, thus providing a dual-acting diverter. In addition, lab results have shown an unexpected result when using combinations of RPM and particulates.

Without being bound by theory or mechanism, it is believed that there is a synergistic interaction between at least some of the various RPMs and the particulate.

In regard to the particulates, in an embodiment of this invention, degradable materials which do not require a remedial cleanup operation can be used. Such materials can include polylactic acid (PLA) such as Biovert NWB, commercially available from Halliburton, solid scale inhibitors such as SCP-2 and Biovert CF, commercially available from Halliburton. Such materials also include combinations of PLA with acid soluble materials such as calcium carbonate, degradable LCM materials such as Baroid's Barofiber Coarse and N-Seal, and various superabsorbents (based on synthetic polymers and natural materials such as starch).

Aloxite Disk Testing

Laboratory testing was performed with flow tests in a test cell through aloxite disks, and is presented below in Table 1. Testing was performed using fluid prepared with 2% KCl in which various compositions of RPM and particulates were added. A total of 100 mL was used in the test cell. The RPM tested was HPT-1 that is commercially available from Halliburton. The particulates tested consisted of combinations of two polylactic acids: Biovert NWB and FDP-1021; Baracarb (BC) which is calcium carbonate with a median particle size of 50 microns, and SCP-2 which is a solid polyphosphate scale inhibitor, all of which are commercially available from Halliburton.

TABLE 1

| RPM (gpt) | Particulate (1 ppg)[1] | Fluid Loss (mL) |
|---|---|---|
| 67 | — | BO in 8 seconds[2] 100 |
| — | 50 NWB/50 BC | BO in 7 seconds 100 |
| 67 | 50 NWB/50 BC | 19 |
| — | 60 NWB/20 FDP-1021/20 SCP-2 | BO in 6 seconds 100 |
| 67 | 60 NWB/20 FDP-1021/20 SCP-2 | 70 |
| 135 | 60 NWB/20 FDP-1021/20 SCP-2 | 24 |

[1]numbers represent weight % of solids
[2]BO = all fluid blew out of the cell in the time shown The formulation containing the RPM alone, with no particulates, did not provide any fluid loss control and all the fluid passed through the disk in 8 seconds. Similarly, two particulate blends tested alone, without any RPM, did not provide any fluid loss control and all the fluid passed through the disk in 7 and 6 seconds. However, the combination of RPM with the particulates gave significantly improved leak off volumes. This implies a synergistic effect between these components.

Simulated Fracture Testing

Figure 3:
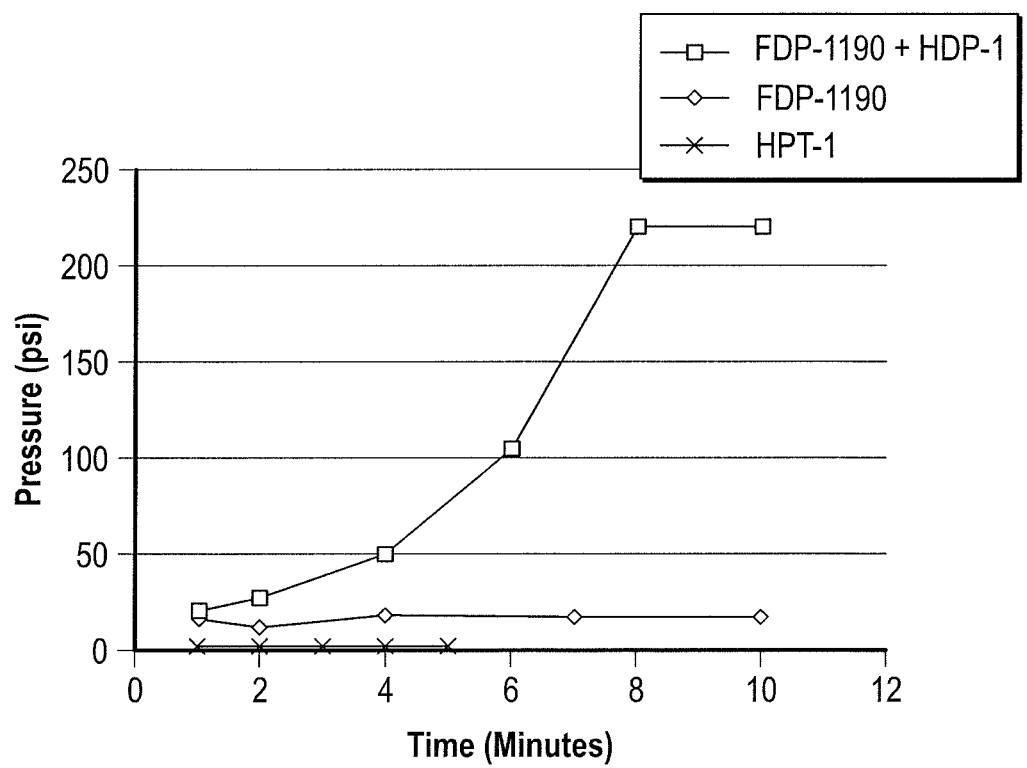
FIG. 3 is a graph of pressure build up vs time from results of a fluid loss test.

In addition to fluid loss testing on aloxite disks, testing has been done on simulated fractures, using stainless steel slotted disks, with slots ranging from 100 to 2000 microns. One illustrative set of tests were comparative pressure buildup tests. Pressure build up is a key component of particle bridging to reduce fluid leak off and provide diversion. This testing has shown the ability of mixtures of FDP-1190, a PLA used as a particulate and HPT-1 as an RPM, to bridge off and provide fluid loss control on these slots. This test was done on a 500 micron slotted disk using a gelled water with 40 ppt WG-38 gelling agent, 1 ppg particulate and 67 gpt of HPT-1 at 120° F. The fluid with particulate only did not show any appreciable pressure buildup, neither did the fluid of RPM only show any appreciable pressure buildup, but the fluid containing a combination of particulate with RPM did result in significant pressure buildup. The results are shown in Table 2 below and also in FIG. 3.

TABLE 2

| Time (min) | FDP-1190 Pressure (psi) | HPT-1 Pressure (psi) | FDP-1190 + HPT-1 Pressure (psi) |
|---|---|---|---|
| 1 | 16 | | |
| 2 | 12 | | |
| 4 | 18 | | |
| 7 | 17 | | |
| 10 | 17 | | |
| 1 | | 1 | |
| 2 | | 1 | |
| 3 | | 1 | |
| 4 | | 1 | |
| 5 | | 1 | |
| 1 | | | 20 |
| 2 | | | 27 |
| 4 | | | 50 |
| 6 | | | 105 |
| 8 | | | 220 |
| 10 | | | 220 |

It is generally assumed that the mechanism for RPM performance is adsorption onto the rock surfaces in a formation, thus inhibiting the permeability through the formation. When testing with stainless steel slotted disks it was anticipated that HPT-1 most likely would not contribute to the leak off control in these metal slots, since the stainless steel slotted disks did not have surfaces as in a formation that would be subject to adsorption of a RPM. As shown in Table 2, the test with HPT-1 alone did not show any pressure build-up, only reaching 1 psi. After 5 minutes all of the test fluid had exited the cell and the test was terminated. However, as shown in FIG. 1, the pressure build-up was dramatically higher for the combination of HPT-1 and FDP-1190 (PLA) compared to either HPT-1 or FDP-1190 alone. Pressure build up is a key component of particle bridging to reduce fluid leak off and provide diversion, and this was an unexpected result.

In some embodiments, the methods can further comprise performing a treatment operation in the portion of the subterranean formation such as, for example, a fracturing operation, an acidizing operation, a gravel packing operation, or a combination thereof. In some embodiments, the methods can further comprise forming a proppant pack or a gravel pack in the portion of the subterranean formation being treated.

In general, treatment fluids used in the present methods can reduce the loss of the fracturing or acidizing fluid by at least about 10%. In alternative embodiments, the treatment fluids can reduce the loss of the fracturing or acidizing fluid by at least about 15%, optionally at least about 20%, optionally at least about 25%, optionally at least about 30%, optionally at least about 35%, optionally at least about 40%, optionally at least about 45%, optionally at least about 50%, optionally at least about 55%, optionally at least about 60%, optionally at least about 65%, optionally at least about 70%, optionally at least about 75%, optionally at least about 80%, optionally at least about 85%, optionally at least about 90%, optionally at least about 95%, optionally about 100%.

The aqueous solutions of the present invention may also contain other well treatment compounds such as but not necessarily limited to clay stabilizers, scale inhibitors, and corrosion inhibitors. For example, the aqueous solution may also contain salts suitable for inhibiting the swelling of clays.

Further, the present treatment fluids can optionally comprise any number of additional additives commonly used in treatment fluids including, for example, crosslinking agents, foaming agents, defoaming agents, antifoam agents, emulsifying agents, de-emulsifying agents, iron control agents, salts, acids, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, fluid loss control additives, gas, catalysts, dispersants, flocculants, scavengers (e.g., $H_2S$ scavengers, $CO_2$ scavengers or $O_2$ scavengers), lubricants, breakers, friction reducers, bridging agents, flocculants, viscosifiers, weighting agents, solubilizers, pH control agents (e.g., buffers), hydrate inhibitors, consolidating agents, bactericides, biocides, breakers, weighting agents, resins, wetting agents, coating enhancement agents, filter cake removal agents, antifreeze agents (e.g., ethylene glycol), and the like. Combinations of these additives can be used as well. A person skilled in the art, with the benefit of this disclosure, will recognize the types of additives that may be included in the treatment fluids of the present disclosure for a particular application.

Gelling agents, such as polysaccharide type viscosity modifiers can be used. For example galactomannan gelling agents may be used, such as in amounts ranging from about 0.06% to about 0.72% by weight. The concentration of the galactomannan gelling agent can be in the range of about 0.12% to about 0.36% by weight, optionally from about 0.25% to about 0.35% by weight.

Further, the solution may optionally contain any suitable proppant known to those skilled in the art.

It is understood with benefit of the present invention that other additives for use in stimulation and well treatments can be employed in the practice of the disclosed method if so desired. For example, thickeners, diversion agents, pH buffers, etc. can be used. Also, internal diverting materials can be used if desired. One example of a suitable diverting agent includes, but is not limited to, viscous water external emulsions.

Without being limited by theoretical explanation, it is believed that the RPM preferentially reduces the permeability of the treated zone to water, which retards migration of an aqueous fluid into the treated section. It is believed that the particulates preferentially reduce the permeability of the fractures, which retards the flow of treatment fluid to existing fractures. It has been observed that when treating with a combination of RPMs and particulates there is a synergistic behavior that provides unexpected beneficial results.

The use of RPM materials known to degrade with time, temperature and/or salinity provides a temporary reduction in the permeability of the formation. The use of a degradable particulate also provides a temporary diverting of the treatment fluid. As a result, a treatment operation such as a fracturing operation, acidizing operation, acid frac or other treatments can be diverted to provide the fluid where desired and contact previously untreated sites, while the diverting agents are not present in the long term and the permeability of the formation is not substantially changed by the presence of the RPM or particulate matter.

While the invention is susceptible to various modifications and alternative forms, certain specific embodiments may be described in detail and shown by way of example. It should be understood, however, that it is not intended to limit the invention to the particular forms disclosed, but, on the contrary, the invention is to cover all modifications and alternatives falling within the scope of the invention as expressed in the appended claims.

An embodiment of the invention is a method for treating a subterranean formation that includes preparing a treatment fluid comprising a base fluid, a relative permeability modifier (RPM) and a particulate and performing a treatment operation by injecting the treatment fluid into a portion of the subterranean formation. The treatment operation can be a fracturing operation, a matrix acidization operation or an acidization fracturing operation. The method can include mixing the treatment fluid using mixing equipment and can include introducing the treatment fluid into a subterranean formation using one or more pumps.

In an embodiment the method includes providing a relative permeability modifier (RPM) and a particulate. A treatment fluid of a base fluid, the RPM and the particulate is prepared and the treatment fluid is placed in at least a portion of a subterranean formation. The method can further include performing a treatment operation in a portion of the subterranean formation by injecting the treatment fluid into a portion of the subterranean formation. The treatment operation can be selected from the group consisting of a fracturing operation, a matrix acidization operation and an acidization fracturing operation. Optionally the method includes mixing the treatment fluid using mixing equipment. Optionally the method includes introducing the treatment fluid into a subterranean formation using one or more pumps.

In an embodiment the RPM can reduce the subterranean formation permeability by reducing the matrix permeability of the subterranean formation. Optionally the RPM reduces the subterranean formation permeability by reducing the permeability of formation microfractures. The particulate can congregate in fractures within the subterranean formation thereby plugging them and reducing the permeability of the formation.

In an embodiment the RPM and particulate diverts the treatment fluid by at least 10%. Optionally the RPM is dimethylaminoethyl methacrylate. Optionally the particulate is a polylactic acid. In an embodiment the RPM and particulate have a synergistic effect that diverts the treatment fluid during the treatment operation. Optionally the RPM and particulates divert the treatment fluid by at least 25%. Optionally by at least 50%. Optionally by at least 75%. Optionally by at least 90%.

In an embodiment the RPM breaks down after the treatment operation. In an optional embodiment the RPM breaks down due to exposure to a formation temperature. In an embodiment the particulate degrades after the treatment operation. In an optional embodiment the particulate degrades due to exposure to a formation temperature after the treatment operation.

As defined herein, a "treatment fluid" is a fluid that is placed in a subterranean formation in order to achieve a desired purpose. Treatment fluids can be used in a variety of subterranean operations, including, but not limited to, stimulation operations, remedial operations, fracturing operations, and gravel packing operations. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. Treatment fluids can include, without limitation, fracturing fluids, acidizing fluids, conformance treatments, damage control fluids, remediation fluids, scale removal and inhibition fluids, and the like.

Treatment fluids of the present invention generally comprise an aqueous phase base fluid. Aqueous phase base fluids can include, for example, fresh water, acidified water, salt water, seawater, brine, or an aqueous salt solution. In some embodiments, the treatment fluids can also contain small amounts of hydrocarbons such that the aqueous base fluid remains as the continuous phase.

In some embodiments, the base fluid comprises an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments. In some embodiments the aqueous salt solution can be 2% KCl.

In other embodiments, the base fluid can comprise fresh water. One of ordinary skill in the art will recognize that fresh water can be obtained from any available source including treated water sources (e.g., drinking water, reclaimed wastewater or desalinated water) or untreated water sources (e.g., streams, lakes or rivers). One of ordinary skill in the art will further recognize that fresh water sources can contain minor amounts of salts, biological materials and other substances that do not substantially affect its use as a base fluid in the present embodiments.

The treatment solutions and methods of the present invention are applicable in both newly-drilled formations and in formations requiring re-stimulation. The solutions and methods of the present invention are particularly useful for formation re-stimulations where hydrocarbons will be present in the formation zones.

The various embodiments of the present invention can be joined in combination with other embodiments of the invention and the listed embodiments herein are not meant to limit the invention. All combinations of various embodiments of the invention are enabled, even if not given in a particular example herein.

While illustrative embodiments have been depicted and described, modifications thereof can be made by one skilled in the art without departing from the scope of the disclosure. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples.

Numerous other modifications, equivalents, and alternatives, will become apparent to those skilled in the art once the above disclosure is fully appreciated. While embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Use of the term "optionally" with respect to any element of a claim is intended to mean that the subject element is required, or alternatively, is not required. Both alternatives are intended to be within the scope of the claim. It is intended that the following claims be interpreted to embrace all such modifications, equivalents, and alternatives where applicable. Other and further embodiments, versions and examples of the invention may be devised without departing from the basic scope thereof and the scope thereof is determined by the claims that follow.

What is claimed is:

1. A method comprising:
   providing a relative permeability modifier (RPM) comprising polylactic acid and a
   copolymer of dimethylaminoethyl methacrylate and cetyldimethylammoniumethyl methacrylate halide; wherein the copolymer is functionalized to include at last one sulfonate moiety,
   providing a particulate;
   preparing a treatment fluid comprising a base fluid, the RPM and the particulate; and
   placing the treatment fluid in at least a portion of a subterranean formation.

2. The method of claim 1, wherein the RPM comprises dimethylaminoethyl methacrylate.

3. The method of claim 1, further comprising mixing the treatment fluid using mixing equipment.

4. The method of claim 1, wherein the treatment fluid is introduced into the subterranean formation using one or more pumps.

5. The method of claim 1, wherein the treatment fluid further comprises calcium carbonate.

6. The method of claim 1, further comprising:
   performing a treatment operation in a portion of the subterranean formation by injecting the treatment fluid into a portion of the subterranean formation.

7. The method of claim 6, wherein the treatment operation comprises at least one treatment selected from the group consisting of a fracturing operation, a matrix acidizing operation and an acidizing fracturing operation.

8. The method of claim 6, wherein the RPM reduces subterranean formation permeability by reducing matrix permeability of the subterranean formation.

9. The method of claim 6, wherein the RPM reduces subterranean formation permeability by reducing permeability of formation microfractures.

10. The method of claim 6, wherein the particulate congregates within fractures within the subterranean formation thereby reducing permeability of the formation.

11. The method of claim 6, wherein the treatment operation diverts the treatment fluid by at least 10%.

12. The method of claim 6, wherein the RPM comprises dimethylaminoethyl methacrylate, the particulate comprises polylactic acid and the RPM and particulate have a synergistic effect that diverts the treatment fluid during the treatment operation.

13. The method of claim 6, wherein after the treatment operation the RPM breaks down.

14. The method of claim 13, wherein the RPM breaks down due to exposure to a formation temperature.

15. The method of claim 6, wherein after the treatment operation the particulate degrades.

16. The method of claim 15, wherein the particulate degrades due to exposure to a formation temperature.

17. A method comprising:
providing a relative permeability modifier (RPM) comprising polylactic acid and a copolymer of dimethylaminoethyl methacrylate and cetyldimethylammoniumethyl methacrylate halide, wherein the copolymer is functionalized to include at least one sulfonate moiety; providing a particulate; preparing a treatment fluid comprising a base fluid, the RPM and the particulate; performing a treatment operation in a portion of a subterranean formation by injecting the treatment fluid into a portion of the subterranean formation.

18. The method of claim 17, wherein the treatment operation comprises at least one treatment selected from the group consisting of a fracturing operation, a matrix acidizing operation and an acidizing fracturing operation.

19. The method of claim 17, wherein the particulate comprises polylactic acid and the RPM and particulate have a synergistic effect that diverts the treatment fluid during the treatment operation.

20. The method of claim 17, wherein the treatment operation diverts the treatment fluid by at least 10%.

21. The method of claim 17, wherein the RPM reduces subterranean formation permeability by reducing matrix permeability of the subterranean formation and the particulate congregates within fractures within the subterranean formation thereby reducing permeability of the subterranean formation.

22. The method of claim 17, further comprising mixing the treatment fluid using mixing equipment.

23. The method of claim 17, wherein the treatment fluid is introduced into the subterranean formation using one or more pumps.

24. A method comprising: providing a relative permeability modifier (RPM); providing a particulate;
preparing a treatment fluid comprising a base fluid, the RPM and the particulate using mixing equipment; and
injecting the treatment fluid into a portion of the subterranean formation using one or more pumps;
wherein the RPM comprises a polymer selected from the group consisting of dimethylaminoethyl methacrylate and cetyldimethylammoniumethyl methacrylate halide copolymer, acrylamide and octadecyldimethylammoniumethyl methacrylate bromide copolymer, dimethylaminoethyl methacrylate and hexadecyldimethylammoniumethyl methacrylate bromide copolymer, dimethylaminoethyl] methacrylate and vinyl pyrrolidone and hexadecyldimethylammoniumethyl methacrylate bromide terpolymer, acrylamide and 2-acrylamido-2-methyl propane sulfonic acid and 2-ethylhexyl methacrylate terpolymer, and combinations thereof, wherein the polymer is functionalized to include at least one sulfonate moiety, wherein the particulate comprises polylactic acid and the RPM and particulate have a synergistic effect that diverts the treatment fluid during the treatment operation that diverts the treatment fluid by at least 10%.

* * * * *

UNITED STATES PATENT AND TRADEMARK OFFICE
CERTIFICATE OF CORRECTION

PATENT NO. : 11,248,167 B2  
APPLICATION NO. : 16/090796  
DATED : February 15, 2022  
INVENTOR(S) : Larry Steven Eoff, Tiffany Anne Pinder and Antonio Recio, III Page 1 of 1

It is certified that error appears in the above-identified patent and that said Letters Patent is hereby corrected as shown below:

In the Claims

Claim 1, Lines 28-29 please remove "wherein the copolymer is functionalized to include at last one sulfonate moiety,"

Claim 17, Lines 13-14 please remove "wherein the copolymer is functionalized to include at least one sulfonate moiety,"

Claim 24, Lines 27-28 please remove "wherein the copolymer is functionalized to include at last one sulfonate moiety,"

Claim 24, Line 22 please remove "dimethyaminoethyl]" and replace with --dimethylaminoethyl--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*